United States Patent [19]

Swadling

[11] Patent Number: 5,521,496
[45] Date of Patent: May 28, 1996

[54] DETECTION CIRCUITS FOR POSITION SENSORS

[75] Inventor: Roger D. Swadling, Cheltenham, United Kingdom

[73] Assignee: Positek Limited, Cheltenham, United Kingdom

[21] Appl. No.: 403,784

[22] PCT Filed: Oct. 1, 1993

[86] PCT No.: PCT/GB93/02046

§ 371 Date: Mar. 16, 1995

§ 102(e) Date: Mar. 16, 1995

[87] PCT Pub. No.: WO94/08207

PCT Pub. Date: Apr. 14, 1994

[30] Foreign Application Priority Data

Oct. 2, 1992 [GB] United Kingdom ............... 9220786

[51] Int. Cl.⁶ .................. G01B 7/14; G01D 5/22
[52] U.S. Cl. ................. 324/207.18; 324/207.19; 340/870.35
[58] Field of Search ........... 324/207.16–207.19, 324/207.24, 233, 234, 239, 240, 662, 671; 340/870.34, 870.35, 870.36

[56] References Cited

U.S. PATENT DOCUMENTS

| 4,253,079 | 2/1981 | Brosh . |
| 4,425,511 | 1/1984 | Brosh . |
| 4,450,443 | 5/1984 | Dolland . |
| 4,507,638 | 3/1985 | Brosh . |
| 4,644,570 | 2/1987 | Brosh et al. . |
| 4,982,156 | 1/1991 | Lewis et al. . |
| 5,283,3519 | 2/1994 | Patzig ................. 324/207.19 |

FOREIGN PATENT DOCUMENTS

| 0215840 | 4/1987 | European Pat. Off. . |
| 0464338 | 1/1992 | European Pat. Off. . |
| 57-013303 | 1/1982 | Japan . |
| 2053487 | 2/1981 | United Kingdom . |

*Primary Examiner*—Gerard R. Strecker
*Attorney, Agent, or Firm*—Young & Thompson

[57] ABSTRACT

A detection circuit for a position sensor has drive circuitry 3 connected to two impedance elements 1a, 1b having an impedance which varies in dependence on the position of a movable member, so as to provide an oscillating signal dependant on the position of the movable member. A demodulator 4, 5, 6, 8, 13, 14 is provided for synchronously demodulating the oscillating signal to provide an output signal indicative of the position of the movable member. The demodulator includes sampling circuitry 4, 5, 13 for sampling the oscillating signal over two defined sampling periods in each cycle of the oscillating signal and for providing a sample voltage output which varies with variation in the impedance due to a change in the position of the movable member. The demodulator additionally includes a comparator 8 for comparing the voltages of the samples obtained over said sampling periods in each cycle, as well as a timing control device 6 for controlling the timing of the sampling in dependence on the result of the comparison so as to ensure that the sample voltage output varies in synchronism with variation in the impedance.

10 Claims, 2 Drawing Sheets

DETECTION CIRCUITS FOR POSITION SENSORS

BACKGROUND OF THE INVENTION

1. Field of the Invention

This invention relates to position sensors for supplying data indicative of the position of a movable member, and is more particularly concerned with a detection circuit for a position sensor having two impedance elements, at least one of which has an impedance which varies in dependence on the position of the movable member.

2. Description of the Related Art

It is known to provide a variable impedance position sensor comprising a variable inductor and a reference inductor connected in series or a differential pair of variable inductors. The detection circuitry of such a sensor commonly incorporates a resonating oscillator which is driven at a controlled voltage level, and a detector for detecting the voltage at the node between the two inductors and synchronously demodulating this voltage to provide an output signal indicative of the position of the movable member.

Most sensors of this type operate at low frequencies in order that the drive voltage and the synchronous demodulation can be controlled easily. However, the use of low frequencies requires that high inductance values are used for the inductors, and this usually requires a large number of turns of small diameter wire in the inductors which can render the sensor both fragile and expensive.

Alternatively sensors of this type are provided which have low inductance values and are designed to be operated at high frequencies. Such sensors can be of simplified and more robust construction because the inductors have fewer turns and can be produced using printed circuit board layout techniques or very much simplified wound coils. However the high frequency operation of such sensors renders the synchronous demodulation of the detected voltage from the oscillator more difficult and subject to some inconsistencies with variation in the position of the movable member. In this regard it is important that the amplitude detection of the oscillator output occurs as closely as possible to the zero-crossing point of the current in the resonant circuit in order to render any variations in the loss resistance of the impedance negligible.

U.S. Pat. No. 4,644,570 discloses a sensor of this type which provides two signals having periods determined by the magnitude of the two inductors, and logic circuitry for providing an output signal indicative of the difference in duration between these two periods divided by the sum of the periods, a predetermined gain being applied to the output signal to provide a signal indicative of the position of the movable member. However such detection circuitry is complex and may also require some temperature compensation.

Reference is also made to other sensors of this type in EP 0215840B, GB 2053487, U.S. Pat. No. 4,450,443, U.S. Pat. No. 4,253,079, U.S. Pat. No. 4,425,511, U.S. Pat. No. 4,507,638, U.S. Pat. No. 4,982,156 and JP 57013303A.

SUMMARY AND OBJECTS OF THE INVENTION

It is an object of the invention to provide an improved detection circuit for a position sensor comprising two impedance elements, which may be either inductors or capacitors, and at least one of which has an impedance which varies in dependence on the position of the movable member.

Such a detection circuit can be designed to produce an output signal of high accuracy, maintaining good linearity over a wide range of positions of the movable member as well as high temperature stability. Furthermore the detection circuitry may be of relatively simple construction, and, because of the linearity of the response of such circuitry, the parts of the sensor can be made relatively compact.

BRIEF DESCRIPTION OF THE DRAWINGS

In order that the invention may be more fully understood, a preferred detection circuit in accordance with the invention will now be described, by way of example, with reference to the accompanying drawings, in which.

DESCRIPTION OF THE PREFERRED EMBODIMENTS

Figure 1:
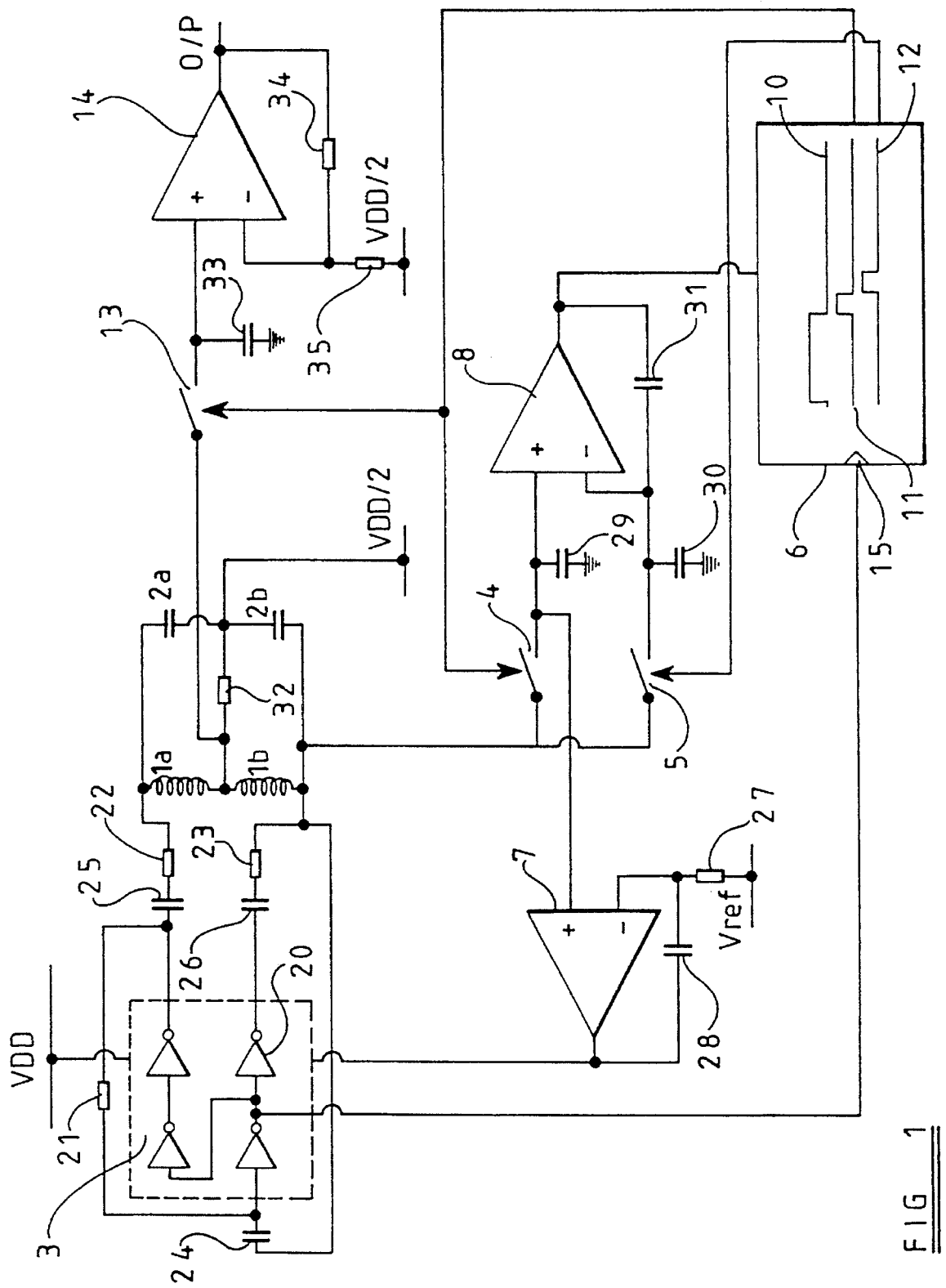
FIG. 1 is a block diagram illustrating the general form of the circuit.

Referring to FIG. 1 the detection circuit is connected to two variable inductors $1a$ and $1b$ forming parts of a position sensor which in addition includes a movable member, such as a sleeve of electrically conductive material partially surrounding the inductors. The inductances of the inductors $1a$ and $1b$ are dependant on the position of the movable member so that, if the member is moved in one direction, the inductance of one of the inductors increases and the inductance of the other inductor decreases, whilst, if the member is moved in the opposite direction, the inductance of the one inductor decreases and the inductance of the other inductor increases. Such a sensor arrangement is well known, as is the fact that the inductors may be arranged along a line with the member being movable linearly to sense linear movement or the fact that the inductors may be arranged along an arc with the member being rotatable to sense rotary movement.

The inductors $1a$ and $1b$ are connected to two capacitors $2a$ and $2b$ and drive circuitry 3 incorporating four inverters 20 so as to form, with resistors 21, 22 and 23 and capacitors 24, 25 and 26, a resonating oscillator circuit. The supply voltage $V_{DD}$ to the drive circuitry 3 controls the oscillator voltage. Furthermore first and second switches 4 and 5 are coupled to a point in the oscillator circuit intermediate the inductor $1b$ and the capacitor $2b$ so as to supply an oscillating signal from the circuit to either the positive input or the negative input of a differential amplifier 8, depending on whether either the switch 4 or the switch 5 is closed. The closing and opening of the switches 4 and 5 is controlled by a timing control device 6 so that the switches 4 and 5 are closed at the required timing and sequentially in order to supply successive sample voltages to the inputs of the amplifier 8.

The sampled voltage outputted from the first switch 4 is also supplied to the positive input of an amplitude control differential amplifier 7 when the switch 4 is closed, the negative input of the amplifier 7 being connected to a reference voltage $V_{ref}$ by a resistor 27 and a capacitor 28. The amplifier 7 serves to vary the supply voltage to the drive circuitry 3 in proportion to the difference between the sampled voltage outputted by the switch 4 and the reference voltage $V_{ref}$. In this way the oscillator voltage at the sampling point is controlled to match the level of the reference voltage $V_{ref}$. Typically the sampling point is arranged to be close to the peak oscillator voltage, and thus the peak oscillator voltage is controlled. The oscillator voltage amplitude may be controlled to be proportional to the sensor supply voltage or to an absolute voltage.

The differential amplifier 8 forms, with capacitors 29, 30 and 31, a comparator which compares the voltage sampled over a first sampling period determined by the closing of the switch 4 with the voltage sampled over a second sampling period determined by closing of the switch 5, and supplies an error signal proportional to the difference between the two sampled voltages to the timing control device 6.

The timing control device 6 incorporates three circuits for producing a delay trigger pulse 10 and first and second sampling trigger pulses 11 and 12. These trigger pulses together control the closing and opening of the switches 4 and 5. The timing control device 6 also incorporates a zero-crossing detector 15 which detects the zero-crossing point of the voltage in the drive circuitry 3 at a point intermediate two of the inverters 20, in order to provide a timing reference trigger point for the delay trigger pulse 10.

Figure 2:
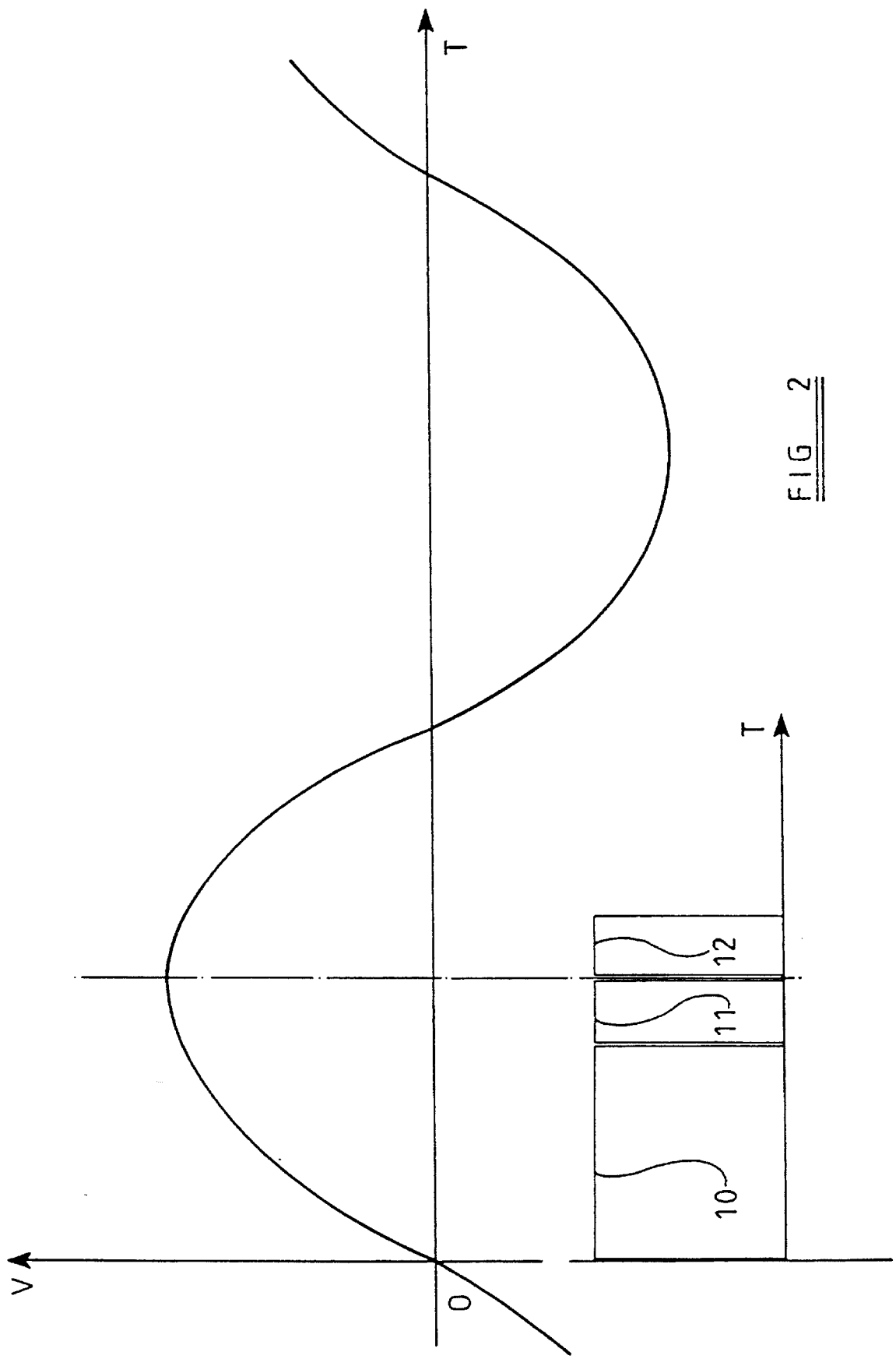
FIG. 2 is a graph showing the variation of the oscillator drive voltage with time.

As will be appreciated more readily by referring to the graph of FIG. 2, the zero-crossing detector 15 detects the zero-crossing point 0 of the waveform of the oscillator drive voltage V against time T. This produces an output from the zero-crossing detector 15 which initiates the delay trigger pulse 10. Furthermore the end of the delay trigger pulse 10 initiates the first sampling trigger pulse 11 which controls the closing of the switch 4 such that the switch 4 is closed for the duration of the first sampling pulse 11. The end of the first sampling trigger pulse 11 initiates the second sampling trigger pulse 12 which controls the closing of the second switch 5 such that the switch 5 is closed for the duration of the second sampling pulse 12.

The error signal from the differential amplifier 8 is used to vary the period of the delay trigger pulse 10 in such a way that the voltages sampled during closing of the switches 4 and 5, that is during the duration of the first and second sampling trigger pulses 11 and 12, are the same. Furthermore the circuit provides a closed loop feedback system by which the duration of the delay trigger pulse 10 is controlled so that the sampled voltages obtained when the switches 4 and 5 are closed are taken over two defined sampling periods which are located on either side of, and symmetrically in relation to, the peak of the oscillator signal. In this way the sampling of the oscillator signal takes place over successive controlled periods of time, as determined by the first and second sampling trigger pulses 11 and 12, having a controlled relationship to the oscillator signal. Although the sampling periods determined by the first and second sampling trigger pulses 11 and 12 occur successively in such an arrangement, it is also possible for the sample periods to be spaced apart, or even to overlap, in time.

The first sampling trigger pulse 11 is also used to control the sampling of the voltage at the node between the impedances 1a and 1b by closing of a third switch 13 connected to the node, as well as to the capacitors 2a and 2b by way of a resistor 32. The voltage sampled by closing of the switch 13 for the duration of the first sampling trigger pulse 11 is supplied to a circuit comprising an amplifier 14, a capacitor 33 and resistors 34 and 35 in order to provide an output signal indicative of the position of the movable member.

Typically the point of minimum current flow in the oscillator occurs sightly in advance of the peak voltage in the oscillator but will vary depending on the design of the inductors and the oscillator circuit. The duration of the first sampling trigger pulse 11 is therefore conveniently set relative to the delay trigger pulse 10 so that the sample voltage taken when the third switch 13 is closed occurs nominally at the point of minimum current flow in the oscillator. However, the arrangement may be such that the duration of the sampling trigger pulses 11 and 12 varies proportionately in relation to the duration of the delay trigger pulse 10. This ensures that the duration of the sampling periods varies as the impedance value changes with the position being sensed, and thus allows the same detection circuit to be operated over a wide range of operating frequencies.

Various modifications of the above described circuit arrangement may be adopted without departing from the scope of the invention. For example a single variable inductor may be used in association with a fixed reference inductor, in place of the two variable inductors 1a and 1b. Furthermore capacitors may be used as the impedance elements in place of the inductors. Another alternative would be for the impedance elements to be driven by an externally generated signal, rather than being incorporated in a resonant circuit.

I claim:

1. A detection circuit for a position sensor, the circuit comprising:

drive means (3) for driving two impedance elements (1a, 1b) connected thereto, at least one of said two impedance elements having an impedance which varies in dependence on the position of a movable member, said drive means and said two impedance elements outputting an oscillating signal dependent on the position of the movable member; and demodulating means (4, 5, 6, 8, 13, 14), connected to said oscillating signal, for synchronously demodulating the oscillating signal to provide an output signal indicative of the position of the movable member;

wherein the demodulating means comprises:

sampling means (4, 5, 13) for sampling the oscillating signal over at least two defined sampling periods in each cycle of the oscillating signal and for providing a sample voltage output for each of said at least two defined sampling periods, said sample voltage output varying with variation in the impedance due to a change in the position of the movable member;

comparison means (8), connected to said sampling means for comparing voltages of said sample voltage output for each of said at least two defined sampling periods obtained by the sampling means (4, 5); and timing control means (6), connected to said comparison means, for controlling a timing of the sampling by the sampling means (4, 5, 13) in dependence on an output of said comparison means (8) so as to ensure that said sample voltage output varies in synchronism with variation in the impedance, whereby said demodulating means, from said sample voltage output, provides said output signal indicative of the position of the movable member.

2. A circuit according to claim 1, wherein the drive means (3) is adapted to form a resonant circuit with the impedance elements (1a, 1b).

3. A circuit according to claim 1, wherein the sampling means (4, 5, 13) comprises first switch means (4, 5) for sampling the oscillating signal over said sampling periods and second switch means (13) for obtaining said sample voltage output by sampling over a sampling duration determined by the timing control means (6).

4. A circuit according to claim 1, wherein the sampling means (4, 5) is arranged to sample the oscillating signal over sampling periods of equal duration in each cycle of the oscillating signal.

5. A circuit according to claim 1, wherein the timing control means (6) is arranged to control the timing of the sampling by the sampling means (4, 5) such that the voltages of the samples obtained over the sampling periods are the same in each cycle of the oscillating signal.

6. A circuit according to claim 1, wherein the timing control means (6) is arranged to control the timing of the sampling by the sampling means (4, 5) such that the oscillating signal is sampled over two defined periods which are located on either side of, and symmetrically in relation to, the peak of the signal.

7. A circuit according to claim 1, wherein the timing control means (6) is arranged to provide, in each cycle of the oscillating signal, a delay signal (10) of a duration determined by the result of the comparison followed by sequential timing signals (11, 12) controlling the sampling periods.

8. A circuit according to claim 1, further comprising zero-crossing detection means (15) for determining the zero-crossing point of an oscillating drive voltage of the drive means (3) and for supplying a timing reference signal dependent on the zero-crossing point to the timing control means (6).

9. A circuit according to claim 1, further comprising amplitude control means (7) arranged to compare the voltage of one of the samples obtained by the sampling means (4, 5) with a reference voltage and to vary the supply to the drive means (3) in order to control the voltage across the impedance elements (1a, 1b) in dependence on the result of the comparison.

10. A circuit according to claim 1, wherein the timing control means (6) is arranged to control the timing of the sampling by the sampling means (4, 5, 13) such that the voltage is sampled at nominally the point of minimum current flow in the circuit.

\* \* \* \* \*